United States Patent [19]

Benson

[11] 4,273,382
[45] Jun. 16, 1981

[54] BODYGUIDE AND HOLDDOWN SYSTEM USABLE WITH DUMP TRUCKS AND TRAILERS

[76] Inventor: Robert W. Benson, Rte. 4, Box 338, Parkersburg, Wood County, W. Va. 26101

[21] Appl. No.: 58,836

[22] Filed: Jul. 19, 1979

[51] Int. Cl.³ .............................................. B60P 1/28
[52] U.S. Cl. ...................................... 298/38; 296/184
[58] Field of Search ................. 298/17 R, 23 A, 23 B, 298/38; 296/35.1, 35.3, 184; 410/79; 267/158, 159, 160, 165; 292/17, 76, 77, DIG. 61, DIG. 73

[56] References Cited

U.S. PATENT DOCUMENTS

| | | | |
|---|---|---|---|
| 672,704 | 4/1901 | Hall | 298/14 |
| 1,463,743 | 7/1923 | Lankston | 298/38 |
| 1,575,943 | 3/1926 | Spence | 298/38 |
| 2,235,136 | 3/1941 | Barrett | 296/184 X |
| 2,465,899 | 3/1949 | Maxon | 298/17 R |
| 4,084,852 | 4/1978 | Prosek et al. | 298/38 X |

Primary Examiner—Leslie J. Paperner
Attorney, Agent, or Firm—Fleit & Jacobson

[57] ABSTRACT

A bodyguide and holddown system for use with dump bodies mounted on vehicles, such as dump trucks and dump trailers. The system has complementary first and second guide and holddown mechanisms or components. One of the components is connected or affixed to the chassis of the dump truck or trailer, with the other component connected to an I-beam support of the dump body. During movement of the dump body from an elevated to a lowered position, the components interact with each other to center the dump body on the chassis. After the dump body has been centered on the chassis, the components interact with each other to releaseably hold the dump body on the chassis and to oppose lateral movement of the dump body with respect to the chassis.

10 Claims, 8 Drawing Figures

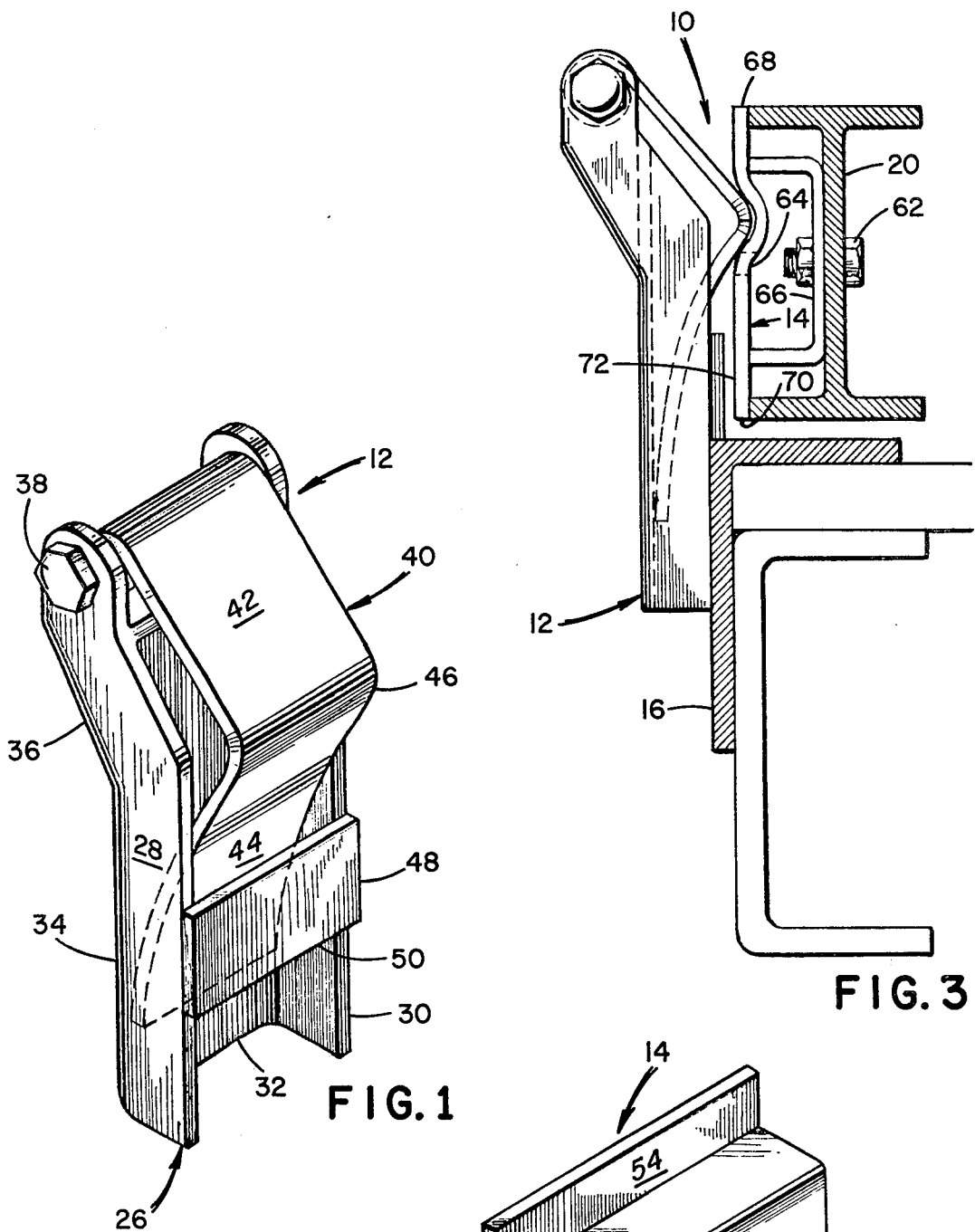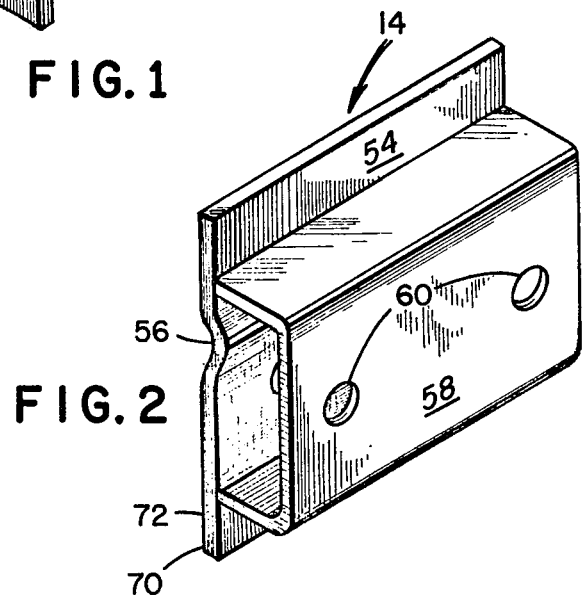

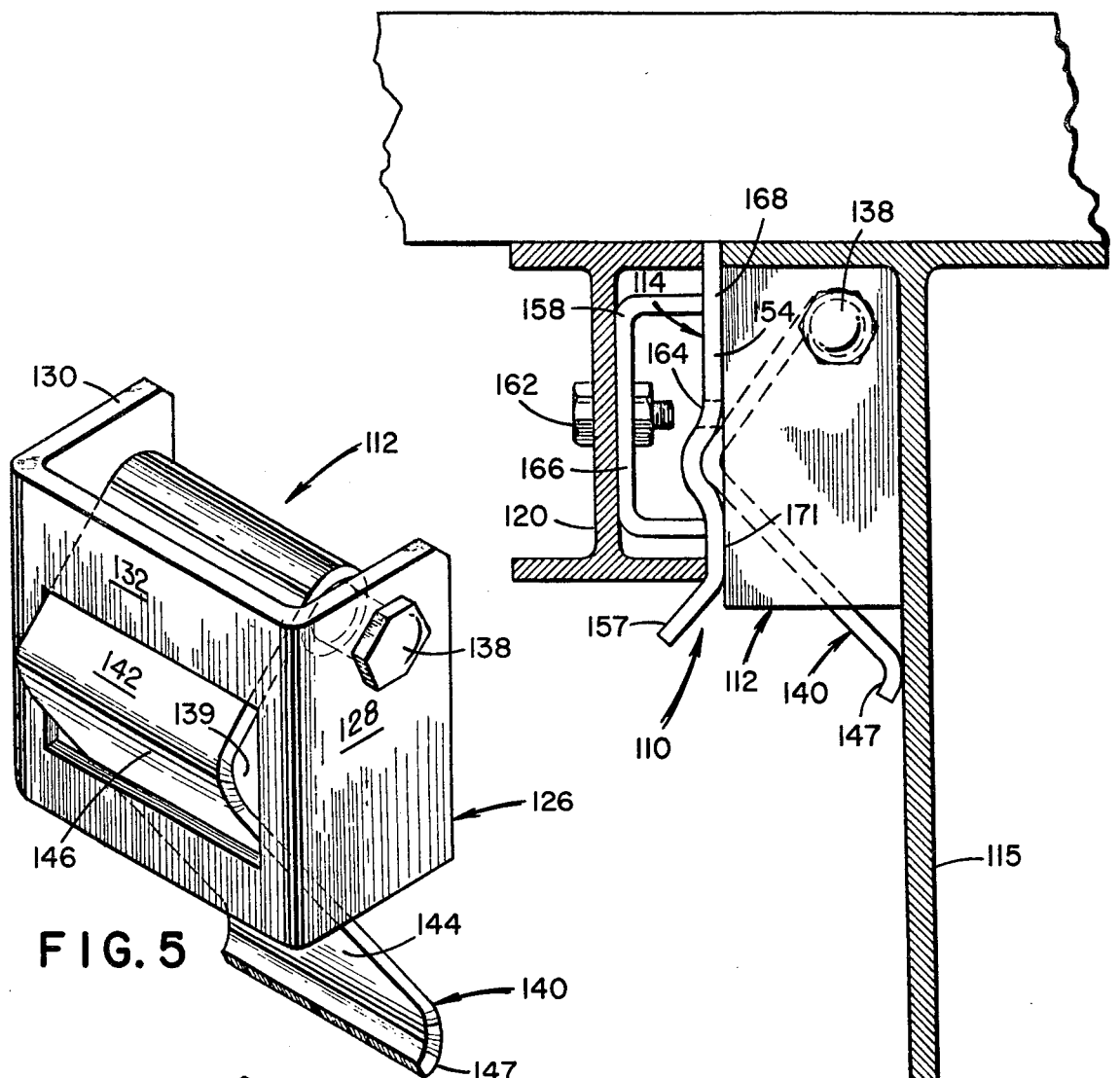
FIG.5
FIG.7
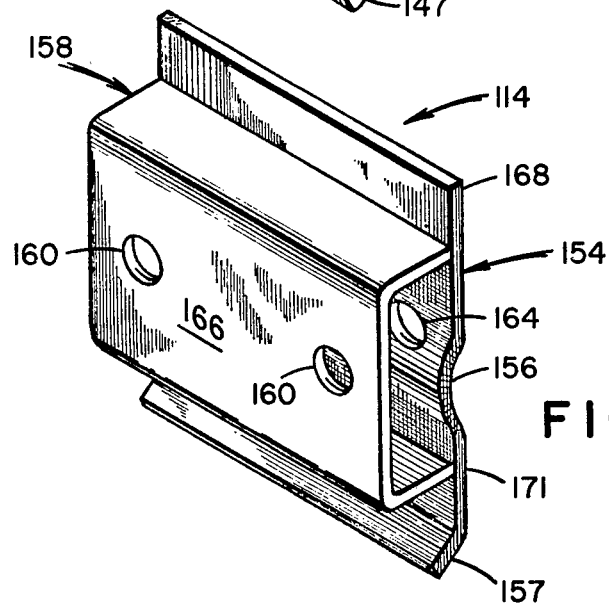
FIG.6

BODYGUIDE AND HOLDDOWN SYSTEM USABLE WITH DUMP TRUCKS AND TRAILERS

BRIEF SUMMARY OF THE INVENTION

This invention relates to improvements in vehicle bodyguide devices and holddown systems. More particularly, the invention relates to mechanisms used to guide and hold dump boxes to the chassis of dump trailers and dump trucks. The invention combines the guide and hold devices in one unit.

It has been found that the integration of two systems, namely the bodyguide and holddown systems, serves several purposes. The bodyguide system assists in the alignment of the dump body with the chassis, so that when the box is returned from the dumping position, the box and frame will be perfectly in line with one another. Further, the bodyguide system curtails sideway motion of the box. The holddown system assists in fastening of the dump box to the chassis and the reduction of up and down movement of the box.

When a holddown device is too rigid, as in the hydraulic type, it prevents any movement of the box and causes damage to the frame. When there is no holddown device, or when the holddown device is too loose, as in the latch type system, it will allow too much up and down movement and cause excessive wear to the underbody structure of the dump unit. The novel and special features of the holddown device of the present invention eliminate most of the bouncing motion while traveling under rough road conditions, thus lowering the noise level. It has also been found that by combining the two functions into one device, costs are lowered by reducing the number of purchases of either one of the other individual devices. Further, expenses are reduced by eliminating one step in the production function.

Accordingly, it is an object of the present invention to provide a system that guides the alignment of a dump box with a chassis, reduces the amount of sideway movement of the dump box with respect to the chassis, and fastens the dump box to the chassis, while not forcing too much stiffness or allowing too much slack. Use of the device or system of the present invention will lessen wear on the frame and the underbody structure of the chassis, diminish the noise level during travel, and lower parts manufacturing costs and production expenses.

Other objects and advantages of the present invention will become more apparent in the detailed description of preferred embodiments of the invention which, for the purposes of the application, have been illustrated in the accompanying drawings.

BRIEF DESCRIPTION OF THE DRAWINGS

In the detailed description of the preferred embodiments of the invention hereinafter discussed, reference is made to the accompanying drawings, in which:

FIG. 1 is a schematic perspective view of one component of a first embodiment of a bodyguide and holddown system according to the present invention;

FIG. 2 is a schematic perspective view of another component of the first embodiment of the present invention;

FIG. 3 is a schematic cross section of a truck chassis and dump body I-beam of a dump truck illustrating use of the components illustrated in FIGS. 1 and 2;

FIG. 5 is schematic perspective view of one component of a second embodiment of a bodyguide and holddown system according to the present invention;

FIG. 6 is a schematic perspective view of a another component of the second embodiment of the present invention;

FIG. 7 is a view similar to FIG. 3 illustrating the position of the components illustrated in FIGS. 5 and 6.

DESCRIPTION OF THE PREFERRED EMBODIMENTS

Figure 4:
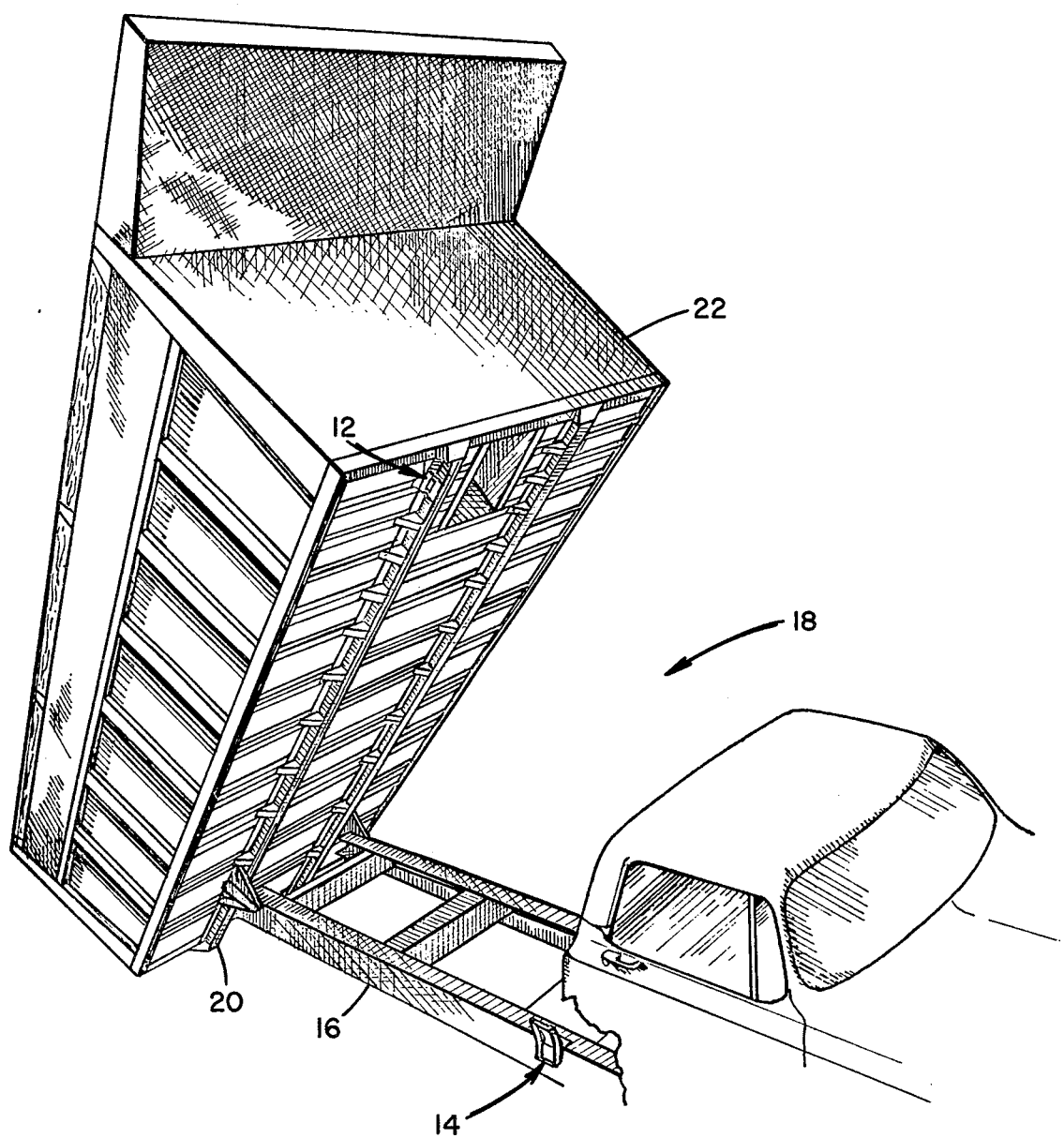
FIG. 4 is a schematic perspective view illustrating one possible location on a truck chassis and dump body of the components illustrated in FIGS. 1 and 2.

Because bodyguide and holddown systems are well known, the present description will be directed in particular to elements forming part of, or cooperating more directly with, the present invention. Elements not specifically shown or described herein are understood to be selectable from those known in the art.

Referring now to the drawings, and to FIGS. 1 to 4 in particular, one embodiment of the present invention is illustrated and will be described in connection with a bodyguide and holddown system, generally designated 10.

The bodyguide and holddown system 10, as illustrated in FIG. 3, includes complementary first and second guide and holddown mechanisms or components, generally designated 12 and 14, respectively. As illustrated in FIGS. 3 and 4, the first mechanism or component 12 is connected to a part of the chassis 16 of a dump truck, generally designated 18. The second component 14 is connected to an I-beam support 20 of a dump body 22 of the truck 18. Alternatively, the locations of the components 12 and 14 are interchanged.

As illustrated in FIG. 1, the first complementary guide and holddown mechanism 12 has a generally U-shaped elongated channel member, generally designated 26. The channel member 26 has legs 28 and 30 interconnected by a base 32. A lower portion 34 of the channel member extends in a generally vertical direction, while an upper portion 36 of the channel member is skewed to the lower portion. Aligned openings are formed in upper portions of the legs 28 and 30 for receiving a bolt 38. The bolt 38 is connected to the channel member and, in turn, connects a leaf spring, generally designated 40, to the channel member 26. The spring 40 has a generally angular shape with upper and lower surfaces, designated 42 and 44, respectively, having conjoint ends forming a protruding engagement surface 46. A mounting plate 48 is affixed to or formed integrally with edges of the legs 28 and 30. A lower surface 50 of the plate 48, as illustrated in FIG. 3, rests on chassis 16 when the first component 12 is affixed thereto.

As illustrated in FIG. 3, the first component 12 is affixed to the chassis by welding. However, it will be appreciated that the first component can be modified so that it can also be bolted or bolted and welded to the chassis.

Referring now to FIG. 2, the second complementary guide and holddown mechanism or component 14 has a generally vertically extending member 54 having a generally horizontally extending shape portion 56 formed therein. The contour of portion 56 is generally complementary to the contour of engagement surface 46, as illustrated in FIG. 3. A generally U-shaped mounting bracket 58 is formed integrally with or welded to member 54. Bracket 58 has openings 60 formed therein for receiving bolts 62 that affix the bracket to I-beam support 20. Preferably, additional openings 64 are formed in member 54 to facilitate tightening of the bolts 62.

As illustrated in FIG. 3, the dimensions of member 54 and mounting bracket 58 are preferably such that base 66 of mounting bracket 58 is in contact with the flange of I-beam support 20, with upper and lower ends 68 and 70, respectively, of member 54 engaging ends of the I-beam support.

Although FIGS. 3 and 4 illustrate the system 10 affixed to the right hand side of truck 18, it will be appreciated that a similar bodyguide and holddown system is preferably connected in a similar manner to the left hand side of the truck. Thus, the two systems interact with each other to ensure proper alignment of the dump body 22 on the chassis 16 of the truck.

In use, the components of the bodyguide and holddown system guide movement of the dump body 22 from the position illustrated in FIG. 4 to the position illustrated in FIG. 3. During movement of the dump body from the elevated to the lowered position, a lower portion 72 of member 54 is contacted by the protruding engagement surface 46. Since engagement surface 46 is part of a leaf spring 40, a force is exerted on the dump body tending to center it on the chassis. It will be appreciated that this force is opposed by a similar force exerted by a system positioned on the left hand side of the truck. Accordingly, these forces ensure centering of the dump body on the chassis. The dump body is held in the centered position by engagement between surfaces 46 and 56. The surfaces also interact to oppose lateral movement of the dump body.

Although FIG. 3 illustrates the bottom of I-beam support 20 spaced from the top of chassis 16, such spacing has been provided primarily for purposes of illustration. It is preferred that the I-beam support rest on the chassis, with leaf spring 40 opposing both lateral and upward vertical movement of the I-beam support away from the chassis.

Referring now to FIGS. 5 to 8, a second embodiment of the present invention is illustrated and will be described in connection with a bodyguide and holddown system, generally designated 110.

Figure 8:
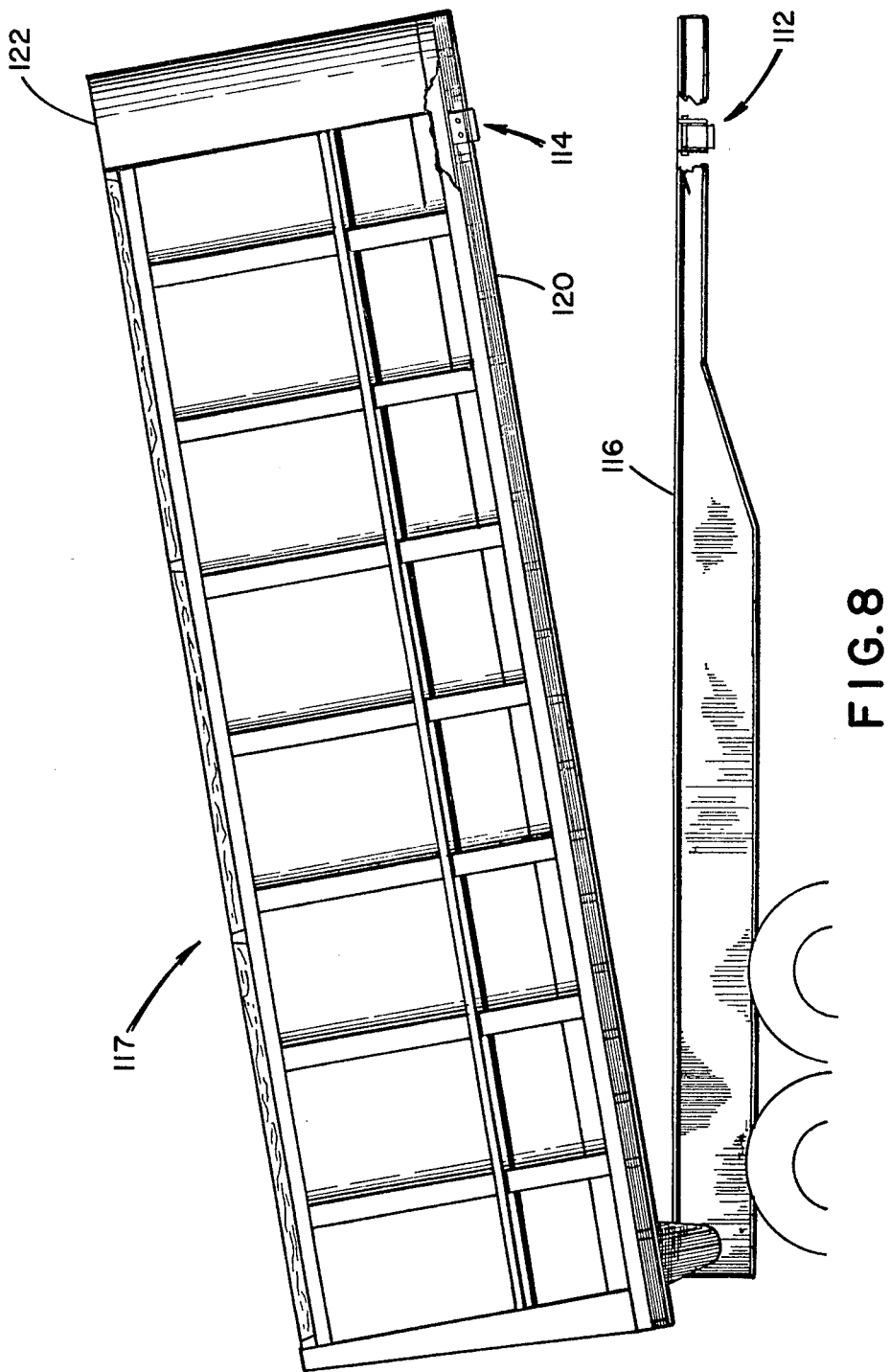
FIG. 8 is a schematic perspective view similar to FIG. 4 illustrating a possible location of the components illustrated in FIGS. 5 and 6.

The system 110, as illustrated in FIG. 7, has complementary first and second guide and holddown mechanisms or components, 112 and 114 respectively. As illustrated in FIGS. 7 and 8, the first component 112 is connected to I-beam support 115 of a chassis 116 of a dump trailer, generally designated 117. The second component 114 is connected to I-beam support 120 of a dump body 122.

As illustrated in FIG. 5, the first component 112 has a generally U-shaped elongated channel member, generally designated 126, having legs 128 and 130 interconnected by a base 132. Upper portions of the legs 128 and 130 have aligned openings formed therein for receiving a bolt 138. Also, the base 132 has an opening 139, which is preferably generally rectangular shaped, formed therein. The bolt 138 connects a leaf spring, generally designated 140, to the channel member 126. The spring 140 has upper and lower surfaces, 142 and 144, respectively, that have conjoint ends that define a protruding engagement surface 146. The spring 140 is connected to the channel member 146 in such manner that the engagement 146 protrudes through the opening 139 formed in the channel member. The lowermost end 147 of lower surface 144 is preferably slightly flared, as illustrated in FIGS. 5 and 7. As illustrated in FIG. 7, end portions of the legs 128 and 130 and the base 132 are affixed, for instance by welding, to I-beam support 115.

Referring now to FIG. 6, the second complementary guide and holddown mechanism or component 114 is illustrated. The second component 114 has a generally vertically extending member 154 having a shaped portion or surface 156 complementary to the shape of engagement surface 146. A generally U-shaped mounting bracket 158 is formed integral with or welded to member 154. Free ends of legs of the bracket 158 are affixed to or integral with member 154 to provide support therefore. The base of the mounting bracket has openings 160 formed therein for receiving bolts 162 that connect component 114 to I-beam support 120. Preferably, aligned openings 164 are formed in member 154 to facilitate tightening of the bolts. A lowermost portion 157 of member 154 is flared for a purpose to be hereinafter described.

Preferably, as illustrated in FIG. 7, the dimensions of second component 114 are selected in such manner that the base 166 of mounting bracket 158 and upper end 168 and a lower portion 171 of member 154 all contact portions I-beam support 120.

For the purposes of clarity, the drawings illustrate the bodyguide and holddown system 110 positioned on one side of dump trailer 117. It will be appreciated that, preferably, such systems are positioned on both sides of the trailer. In use, the system 110 is intended to guide and center dump body 122 during its movement from the elevated position illustrated in FIG. 8 to the lowered position illustrated in FIG. 7. Also, the system 110 provides a mechanism for releaseably locking the dump body in the position illustrated in FIG. 7. During the movement of the dump body 122 from the position illustrated in FIG. 8 to that illustrated in FIG. 7, flared lowermost portion 157 is positioned in such manner that it will contact I-beam support 115, if the dump body 122 is not in alignment with the chassis 116. Such contact will urge the dump body into alignment with the chassis. When the dump body finally comes to rest on the chassis, engagement surface 146 and shaped portion 156 engage each other to releasably hold the dump body on the chassis. This engagement will also tend to resist lateral shifting of the dump body with respect to the chassis.

From the preceding description of preferred embodiments of the present invention, it can be seen that the present invention provides a system that centers a dump body on a chassis of a vehicle, such as a dump truck or dump trailer, releaseably holds the dump body on the chassis, and opposes lateral shifting of the dump body with respect to the chassis. All of these features are provided by two complementary components. Thus, the present invention greatly facilitates both the positioning and holding of the dump body on the chassis.

The invention has been described in detail with particular reference to preferred embodiments thereof, but it will be understood that variations and modifications can be effected within the spirit and scope of the invention.

What is claimed is:

1. A bodyguide and holddown system for use with a dump body mounted on a vehicle, said system having first and second complementary components that interact with each other to center the dump body on a chassis of the vehicle, releaseably hold the dump body on the chassis, and oppose lateral movement of the dump body with respect to the chassis;

said first complementary component being affixable to one of the dump body and the chassis and comprising:

a generally U-shaped member having a portion thereof affixable to one of the dump body and the chassis and openings formed in upper portions thereof for receiving a bolt;

a bolt extending through said openings and connected to said U-shaped member; and a spring member connected to said U-shaped member by said bolt and having a horizontally extending portion thereof forming an engagement surface; and said second complementary component being affixable to the other of the dump body and the chassis and comprising a generally vertically extending member having a horizontally extending shaped portion formed therein;

said first and said second complementary components being affixable to the dump body and the chassis in such manner that contact between said spring member and said vertically extending member during movement of the dump body towards the chassis tends to center the dump body on the chassis and engagement between said engagement surface and said horizontally extending shaped portion releasably holds the dump body on the chassis.

2. A bodyguide and holddown system according to claim 1, wherein said first complementary component is affixable to the chassis.

3. A bodyguide and holddown system according to claim 2, wherein free ends of legs of said U-shaped member are affixable to the chassis, wherein an upper portion of said U-shaped member is skewed to a lower portion thereof, and wherein said engagement surface of said spring member extends beyond the free ends of said legs to project over the chassis.

4. A bodyguide and holddown system according to claim 2, wherein said U-shaped member has an opening formed in its base through which said engagement surface of said spring member projects portions.

5. A bodyguide and holddown system according to claim 2, claim 3, or claim 4, wherein said second complementary component further comprises a generally U-shaped mounting bracket having free ends of legs of the bracket affixed to said vertically extending member.

6. A bodyguide and holddown system according to claim 4, wherein said vertically extending member has a lowermost portion thereof flared away from an upper portion thereof, said flared lowermost portion being engageable by portions of said first complementary component for centering the dump body on the chassis.

7. A bodyguide and holddown system according to claim 1, wherein first and second pairs of interacting complementary components are affixed to both sides of the dump body and the chassis, the pairs cooperating with each other to center the dump body on the chassis.

8. A bodyguide and holddown system according to claim 3, wherein said spring member has a lower end portion positioned in contact with the base of said U-shaped member.

9. A bodyguide and holddown system according to claim 3, wherein a mounting plate extends between edges of free ends of the legs of said U-shaped member, said mounting plate having a bottom edge positionable in contact with a horizontal surface of said chassis.

10. A bodyguide and holddown system according to claim 4, wherein said spring member has a lower end portion positioned in contact with a vertically extending portion of said chassis.

* * * * *